(12) United States Patent
Shrivastava et al.

(10) Patent No.: US 9,746,868 B2
(45) Date of Patent: Aug. 29, 2017

(54) SINGLE INDUCTOR MULTIPLE OUTPUT DISCONTINUOUS MODE DC-DC CONVERTER AND PROCESS

(71) Applicant: TEXAS INSTRUMENTS INCORPORATED, Dallas, TX (US)

(72) Inventors: Aatmesh Shrivastava, Cambridge, MA (US); Yogesh Ramadass, Dallas, TX (US); Steven Bartling, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1074 days.

(21) Appl. No.: 13/768,983

(22) Filed: Feb. 15, 2013

(65) Prior Publication Data

US 2014/0103728 A1    Apr. 17, 2014

Related U.S. Application Data

(60) Provisional application No. 61/715,083, filed on Oct. 17, 2012.

(51) Int. Cl.
*H02J 7/00* (2006.01)
*G05F 3/08* (2006.01)
(Continued)

(52) U.S. Cl.
CPC ............... *G05F 3/08* (2013.01); *H02J 1/00* (2013.01); *H02M 3/1563* (2013.01);
(Continued)

(58) Field of Classification Search
CPC .... H02J 17/00; H02J 5/005; H02J 3/01; H02J 7/0065; H01F 38/14; H01F 27/006;
(Continued)

(56) References Cited

U.S. PATENT DOCUMENTS 7,287,966 B2 * 10/2007 French ................... F02M 51/04
417/416
2004/0061478 A1    4/2004 French et al.
(Continued)

FOREIGN PATENT DOCUMENTS

CN    101311024 A    11/2008
CN    201639546 U    11/2010
(Continued)

OTHER PUBLICATIONS

Search Report dated Feb. 6, 2017.

*Primary Examiner* — Rexford Barnie
*Assistant Examiner* — Terrence Willoughby
(74) *Attorney, Agent, or Firm* — Lawrence J. Bassuk; Charles A. Brill; Frank D. Cimino

(57) ABSTRACT

A system comprising an ambient energy source, a power supply, and a power storage device. The ambient energy source is coupled to a first terminal end of an inductor. The power supply is also coupled to the first terminal end of the inductor. The power storage device is coupled to a second terminal end of the inductor. The ambient energy source provides power through the inductor in a first direction to the power storage device. The power storage device provides power through the inductor to the power supply in a second direction opposite the first direction.

13 Claims, 4 Drawing Sheets

(51) Int. Cl.
*H02M 3/156* (2006.01)
*H02J 1/00* (2006.01)
*H02M 3/158* (2006.01)

(52) U.S. Cl.
CPC ......... *H02M 3/1582* (2013.01); *Y10T 307/50* (2015.04); *Y10T 307/696* (2015.04)

(58) Field of Classification Search
CPC  B60L 11/182; B60L 11/1829; B60L 11/1831; H02M 3/1582; H02M 3/00
USPC .................................. 307/43, 104
See application file for complete search history.

(56) References Cited

U.S. PATENT DOCUMENTS

2011/0298288 A1* 12/2011 Cho .................... H01M 10/465
307/70
2014/0001856 A1* 1/2014 Agamy ................ H02M 3/155
307/43

FOREIGN PATENT DOCUMENTS

| | | |
|---|---|---|
| CN | 102215012 A | 10/2011 |
| CN | 102647150 A | 8/2012 |
| CN | 202474879 U | 10/2012 |

\* cited by examiner

SINGLE INDUCTOR MULTIPLE OUTPUT DISCONTINUOUS MODE DC-DC CONVERTER AND PROCESS

CROSS-REFERENCE TO RELATED APPLICATION

The present application claims priority to U.S. Provisional Patent Application No. 61/715,083, filed on Oct. 17, 2012; which is hereby incorporated herein by reference in its entirety.

BACKGROUND

A direct current (DC) to direct current converter is an electronic circuit that converts an input DC supply voltage into a DC output voltage that is higher or lower in magnitude than the input DC supply voltage. A DC to DC converter that generates an output voltage lower than the input voltage is termed a buck or step-down converter. A DC to DC converter that generates an output voltage higher than the input voltage is termed a boost or step-up converter. A typical DC to DC converter includes a switch for alternately opening and closing a current path through an inductor in response to a switching signal. In operation, a DC voltage is applied across the inductor. Electrical energy is transferred to a load connected to the inductor by alternately opening and closing the switch as a function of the switching signal. The amount of electrical energy transferred to the load is a function of the duty cycle of the switch and the frequency of the switching signal. DC to DC converters are widely used to power electronic devices, particularly battery-powered devices, such as portable cellular phones, laptop computers, and other electronic systems in which efficient use of power is desirable.

Energy harvesting is the process by which energy is derived from external sources, such as solar power, wind energy, kinetic energy, and thermal energy, captured, and stored. Energy harvesting may be utilized in small, wireless devices such as devices in wireless sensor networks. Typically, an energy harvesting system collects ambient energy and utilizes a boost DC to DC converter to provide a higher output voltage than provided by the ambient source. The voltage then may be stored in a storage element.

A typical power management system utilizes a low-dropout regulator (LDO) to lower output voltage from the storage element which is to be provided to a load. The LDO operates as a resistive voltage divider. Thus, a large amount of power may be lost in regulation. This may be problematic, especially for low power applications.

SUMMARY

The problems noted above are solved in large part by systems and methods for energy management and harvesting interface using a single inductor. In some embodiments, the system includes an ambient energy source, a power supply, and a power storage device. The ambient energy source is coupled to a first terminal end of an inductor. The power supply is also coupled to the first terminal end of the inductor. The power storage device is coupled to a second terminal end of the inductor. The ambient energy source provides power through the inductor in a first direction to the power storage device. The power storage device provides power through the inductor to the power supply in a second direction opposite the first direction.

Another illustrative embodiment includes a method that comprises providing power from an ambient energy source coupled to a first terminal end of an inductor through the inductor and a first switch to a power storage device coupled to a second terminal end of the inductor. The method also includes providing power, at a separate time than the providing power from the ambient energy source, from the power storage device through the inductor and a second switch to a power supply coupled to the first terminal end of the inductor. The method also comprises detecting power found in the power supply to determine whether the first switch and the second switch should be open or closed.

Yet another illustrative embodiment is a system including an ambient energy source coupled to a boost converter. The boost converter comprises an inductor and a first switch. The system also comprises a first power supply coupled to a first buck converter. The first buck converter comprises the inductor and a second switch. The system also comprises a power storage device coupled to the boost converter and the first buck converter. The system also comprises an arbiter configured to cause the second switch to close and the first switch to open when the first power supply requires more power.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
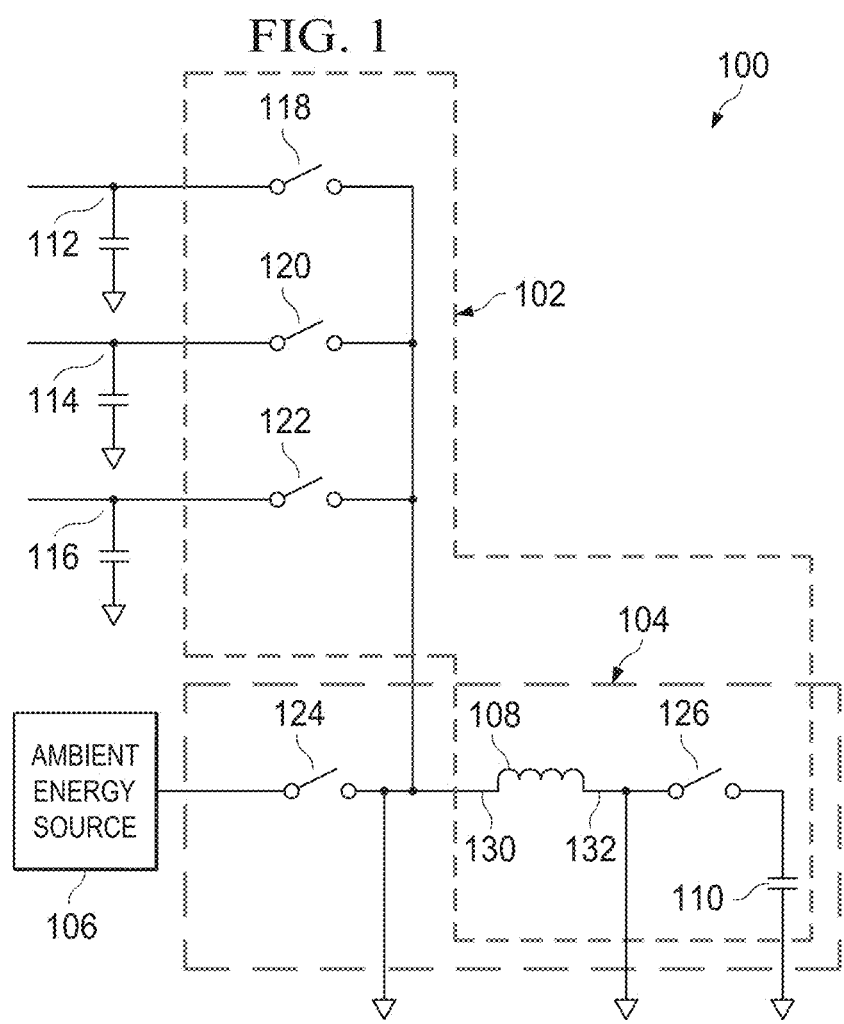
FIG. 1 shows a block diagram of an illustrative single inductor energy management and harvesting interface circuit in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Utilizing a single inductor as part of the boost, also known as step-up, DC to DC converter of an energy harvesting system and sharing that same inductor as part of a buck, also known as a step-down, DC to DC converter of an energy management system reduces power loss and costs of the entire energy management and harvesting system. The energy harvesting system stores energy from an ambient source, such as solar power, for later use by the energy management system. The power acquired from the ambient source is stepped-up, utilizing a boost converter, and then stored in a power storage device. The power storage device then is able to provide power to loads through the energy management system. The power from the power storage device is stepped-down, utilizing a buck converter, which then goes through one or more power supplies and eventually on to one or more loads. Both the boost converter of the energy harvesting system and the buck converter of the energy management system apply voltage across the same inductor, thus minimizing the cost of having multiple inductors. Additionally, because the energy management system is utilizing a DC to DC converter instead of a LDO, the system is more efficient because voltage need not be divided resistively. A DC to DC converter uses reactive components which ideally do not incur loss.

FIG. 1 shows a block diagram of an illustrative single inductor energy management and harvesting interface circuit 100 in accordance with various embodiments. Circuit 100 includes at least one buck converter 102 for energy management and at least one boost converter 104 for energy harvesting. While three buck converters are depicted in FIG. 1, one or more buck converters are required. Also, while only one boost converter 104 is depicted, more may be utilized. Boost converter 104 steps-up power, i.e. the output voltage is higher than the source voltage, from ambient energy source 106 for storage in power storage device 110. Both the buck converters found in 102 and boost converter 104 may operate in the discontinuous conduction mode (DCM). Ambient energy source 106 may be a photovoltaic cell which converts solar radiation into direct current. Ambient energy source 106 may also be any device which takes ambient energy and converts it into direct current, such as a thermoelectric generator. Power storage device 110 may be any device capable of storing power, such as a battery or capacitor (e.g. super capacitor).

One of the buck converters in 102 steps-down power, i.e. the output voltage is lower than the source voltage, provided by power storage device 110 to power supply 112. As depicted, other buck converters in 102 step-down power from power storage device 110 to power supplies 114 and 116. The power supplies 112-116 are rails of voltage in which a load may be attached to receive the power. Power supplies 112-116 may include an energy storage device such as a capacitor to receive and discharge power so as to manage a constant voltage along the rail over time. While power supplies 112-116 may be designed to carry any voltage, in one embodiment, power supply 112 is designed to carry 1.2 volts, power supply 114 is designed to carry 1.5 volts, and power supply 116 is designed to carry 3.3 volts.

Boost converter 104 may include switches 124 and 126 and inductor 108. Switch 124 connects to ambient energy source 106 and to a first terminal end 130 of inductor 108. Switch 126 connects to power storage device 110 and a second terminal end 132 of inductor 108. The buck converters of 102 may include switches 118-122, switch 126 and inductor 108. Switches 118-122 connect to their respective power supplies 112-116 and to the first terminal end 130 of inductor 108. Both boost converter 104 and the buck converters of 102 utilize inductor 108 and switch 126 which are connected to power storage device 110 in the same way for both boost converter 104 and the buck converters of 102. In other words, switch 126 connects to power storage device 110 and a second terminal end 132 of inductor 108 in both boost converter 104 and the buck converters of 102.

Hence, the ambient energy source 106 provides power to power storage device 110 through inductor 108 in a first direction while power storage device 110 provides power through inductor 108 to power supplies 112-116 in the opposite direction. The amount of electrical energy transferred from ambient energy source 104 to power storage device 110 and from power storage device 110 to power supplies 112-116 is a function of the duty cycle, the alternating opening and closing, and the frequency of the switching signal of switch 126.

In an embodiment, switches 118-124 control which of the boost converter 104 or one of the buck converters of 102 are being utilized by the system. If switch 124 is closed, then switches 118-122 are open. Power flows from ambient energy source 106 through boost converter 104 where the voltage is stepped-up and into power storage device 110. However, when power is provided from power storage device 110 into one of power supplies 112-116 through inductor 108, switch 124 is open. If power supply 112 is receiving power, then switch 118 is closed while switches 120-124 are open. If power supply 114 is receiving power, then switch 120 is closed while switches 118, 122, and 124 are open. Likewise, if power supply 116 is receiving power, then switch 122 is closed while switches 118, 120, and 124 are open.

Figure 2:
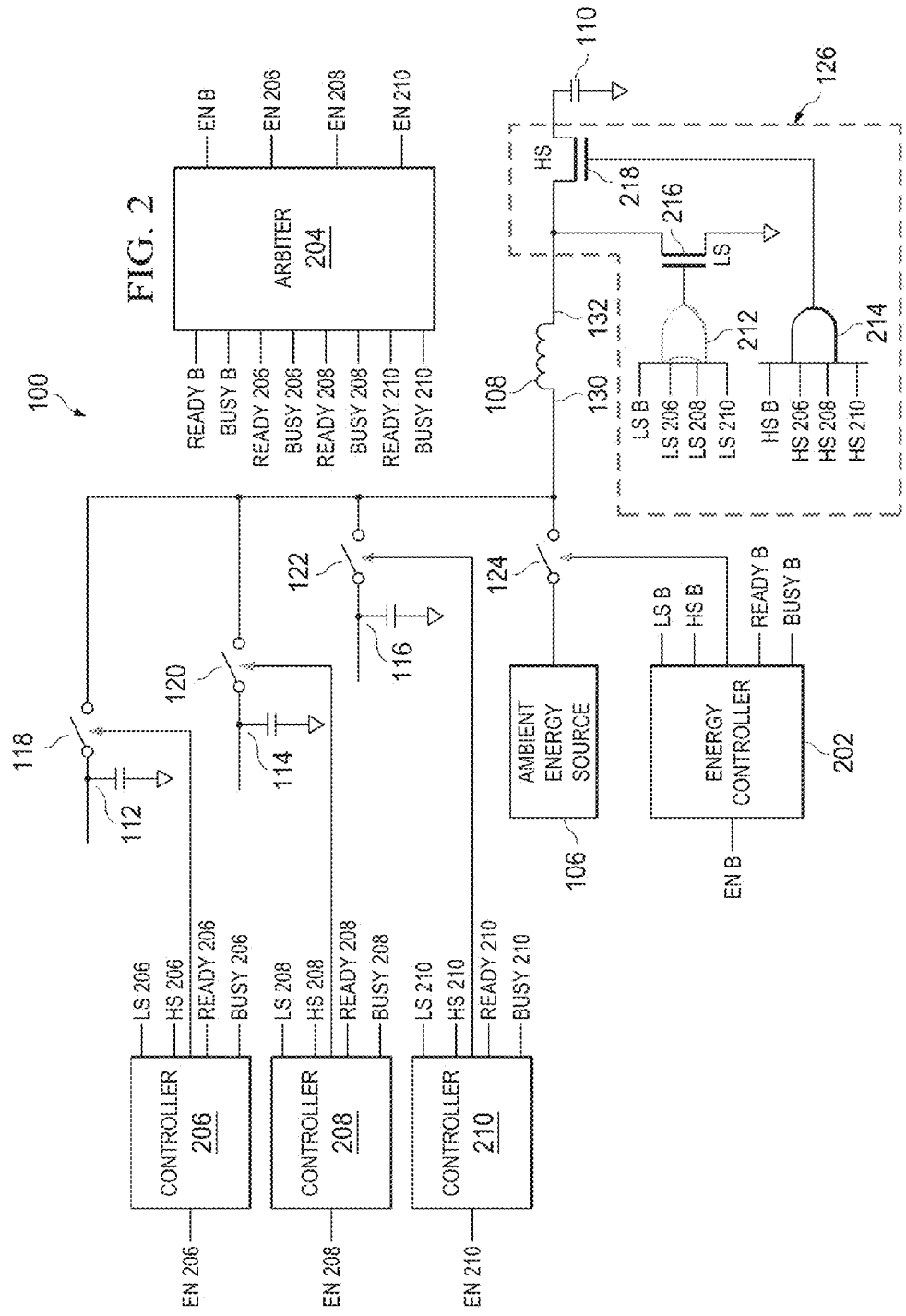
FIG. 2 shows a detailed block diagram of an illustrative single inductor energy management and harvesting interface circuit in accordance with various embodiments.

FIG. 2 shows a detailed block diagram of the illustrative single inductor energy management and harvesting interface circuit 100 in accordance with various embodiments. Circuit 100 comprises, as noted under FIG. 1, an ambient energy source 106, power storage device 110, power supplies 112-116, inductor 108, and switches 118-126. Circuit 100 also comprises arbiter 204, energy harvester controller 202, and power supply controllers 206-210.

Energy harvester controller 202 is configured to open and close switch 124. Power supply controller 206 is configured to open and close switch 118. Power supply controller 208 is configured to open and close switch 120. Power supply controller 210 is configured to open and close switch 122.

Energy harvester controller 202 and power supply controllers 206-210 are also configured to monitor the respective states of their switches 118-124. Thus, energy harvester controller 202 monitors whether switch 124 is opened or closed. Likewise, power supply controllers 206-210 monitor whether switches 118-122 are opened or closed. Additionally, power supply controllers 206-210 monitor the voltage found at power supplies 112-116. For example, power supply controller 206 monitors the voltage at power supply 112.

Energy harvester controller 202 and power supply controllers 206-210 are connected to arbiter 204. Energy harvester controller 202 is connected to arbiter 204 through connections EN B, Ready B, and Busy B. Power supply controller 206 is connected to arbiter 204 through connections EN 206, Ready 206, and Busy 206. Power supply controller 208 is connected to arbiter 204 through connections EN 208, Ready 208, and Busy 208. Power supply controller 210 is connected to arbiter 204 through connections EN 210, Ready 210, and Busy 210. Thus, data and control signals may be sent between arbiter 204 and energy harvester controller 202 and power supply controllers 206-210.

In an embodiment, the switch state monitored by energy harvester controller 202 and power supply controllers 206-210 as well as the voltage monitored by power supply controllers 206-210 are constantly sent to the arbiter 204. Arbiter 204 then is configured to assign priority of switching with regards to switches 118-124 as discussed below.

If one of the power supplies 112-116 requires more power (i.e. the power on the rail is dropping off or the rail has less power than a required amount), arbiter 204 makes the determination that storage device 110 should provide power to the power supply 112-116 that requires more power. For example, if power supply 112 requires more power, arbiter 204 makes the determination that power storage device 110 shall send more voltage to power supply 112 through inductor 108. This requires that switch 118 be closed and switches 120-124 be opened. Arbiter 204 then signals power supply controller 206 to close switch 118. Arbiter 204 also signals energy harvester controller 202 and power supply controllers 208 and 210 to open their respective switches, switches 120-124. Hence, power flows from power storage device 110 through inductor 108 to power supply 112. Thus, arbiter 204 indirectly controls switches 118-124 through their respective controllers 202, and 206-210.

Similarly, if any of the other power supplies 122 and 124 requires more power, arbiter 204 makes the determination to send power from power storage device 110 through inductor 108 to the power supply 122 or 124 which requires more power. Arbiter 204 then sends a signal to the power supply controller 208 or 210 to close its respective switch 122 or 124. Arbiter 204 also sends a signal to each of the other power supply controllers 206 and 208 or 210 and energy harvester controller 202 to open their respective switches.

If all of the power supplies 112-116 have sufficient power (i.e. the power on the rail is constant at the required level for that rail), arbiter 204 makes the determination that ambient energy source 106 should provide power to the power storage device 110. This requires that switch 124 be closed and switches 118-122 be opened. Arbiter 204 signals energy harvester controller 202 to close switch 124. Arbiter 204 also signals power supply controllers 206-210 to open switches 118-122. Power then flows from ambient energy source 106 through inductor 108 to power storage device 110. Because, in an embodiment, arbiter 204 sends power from ambient energy source 106 to power storage device 110 only if the power supplies 112-116 have sufficient power, arbiter 204 prioritizes sending power from power storage device 110 to one of the power supplies 112-116 over sending power from ambient energy source 106 to power storage device 110.

In an embodiment, only one switch of switches 118-124 may be closed at a time. Thus, in an embodiment, if arbiter 204 receives information that one of the power supplies 112-116 requires more power while one of the switches 118-122 associated with another power supply is closed, arbiter 204 will signal the controller 206-210 associated with power supply requiring more power to close only when the switch associated with the other power supply opens based on the arbiter 204 signaling its associated controller to open because its associated power supply has sufficient power. In other embodiments, more than one switch of switches 118-122 may be closed at a time; however, switch 124 is open when any of switches 118-122 is closed. Hence, power flows in one direction when ambient energy source 106 is powering power storage device 110 through inductor 108 and the opposite direction when power storage device 110 is powering any of power supplies 112-116 through inductor 108.

Switch 126 may be comprised of high side transistor 218, AND gate 214, low side transistor 216, and OR gate 212. OR gate 212 is connected to energy harvester 202 through connection LS B. OR gate 212 is connected to power supply controller 206 through connection LS 206. OR gate 212 is connected to power supply controller 208 through connection LS 208. OR gate 212 is connected to power supply controller 210 through connection LS 210. AND gate 214 is connected to energy harvester 202 through connection HS B. AND gate 214 is connected to power supply controller 206 through connection HS 206. AND gate 214 is connected to power supply controller 208 through connection HS 208. AND gate 214 is connected to power supply controller 210 through connection HS 210. Low side transistor 216 is connected to the second terminal end 132 of the inductor 108, OR gate 212, and high side transistor 218. High side inductor 218 is connected to the second terminal end 132 of the inductor 108, AND gate 214, and power storage device 110.

Energy harvester controller 202 and power supply controllers 206-210 control switch 126 by signaling low side transistor 216 and high side transistor 218. The ratio of the amount of time low side transistor 216 and high side transistor 218 are open and closed, as well as the order in which they are opened and closed, determines whether voltage through inductor 108 is stepped-up or stepped-down. Thus, if arbiter 204 determines that one of the power supplies 112-116 requires more power, it signals the power supply controller 206-210 associated with the power supply that requires more power to control, not only its associated switch 118-122, but also switch 126 to create voltage that is stepped-down when it passes from power storage device 110 to the power supply 112-116 that requires more power. Likewise, when arbiter 204 determines that none of the power supplies 112-116 requires more power, it sends a signal to energy harvester controller 202 to control not only its associated switch 124, but also switch 126 to create voltage that is stepped-up when it passes from ambient energy source 106 to power storage device 110. Thus, like its control over switches 118-124, arbiter 204 controls switch 126 through energy harvester controller 202 and power supply controllers 206-210 and hence, controls whether the converter operates as a boost or buck converter.

Figure 3:
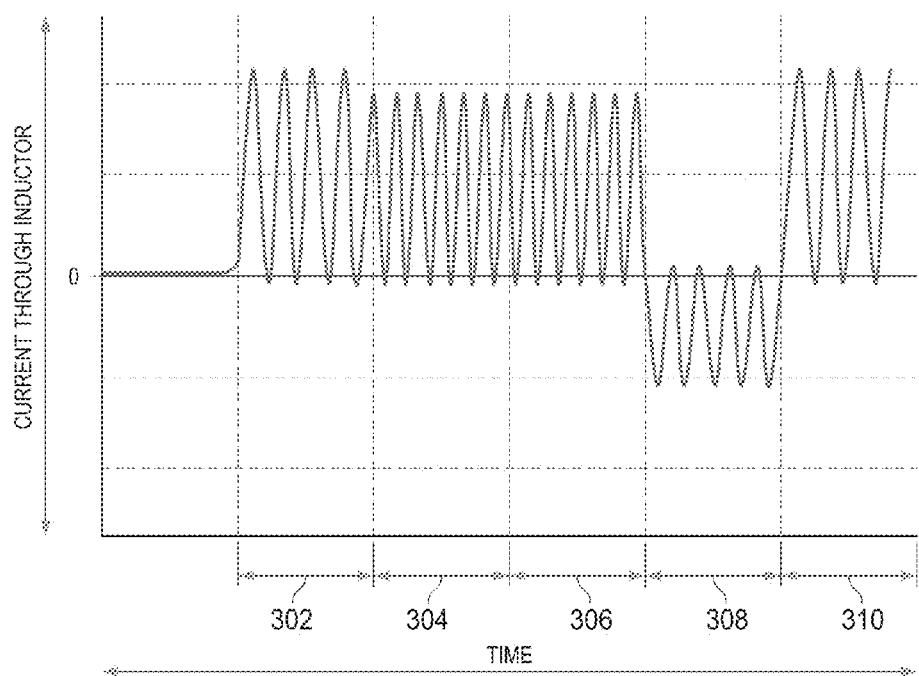
FIG. 3 shows a conceptual illustration of the technique disclosed herein, in accordance with various embodiments.

FIG. 3 shows a conceptual illustration 300 of the current flowing through inductor 108, in accordance with various embodiments. As noted previously, ambient energy source 106 may provide power to power storage device 110 through boost converter 104. Power storage device 110 may provide power to power supplies 112-116 through the buck converters of 102. FIG. 3 illustrates an example of the current that may flow through inductor 108, as part of boost converter 104 and buck converter 102. In an embodiment, in time block 302, power storage device 110 may provide power to power supply 112 through switch 126, inductor 108, and switch 118, which act as a buck converter of 102. As shown in time block 302, the current through inductor 108 is positive.

In time block 304, the power storage device 110 may provide power to power supply 114 through switch 126, inductor 108, and switch 120, which act as a buck converter of 102. As in time block 302, the current in time block 304 through inductor 108 is positive. Similarly, in time block 306, the power storage device 110 may provide power to power supply 116 through switch 126, inductor 108, and switch 122, which act as a buck converter of 102. As in time blocks 302 and 304, the current in time block 306 through inductor 108 is positive.

However, in time block 310, power may be supplied from ambient energy source 106 to power storage device 110 through switch 124, inductor 108, and switch 126, acting as boost converter 104. In time block 308, the current through inductor 108 is negative. In time block 310, the power storage device 110 may once again power one of power supplies 112-116. Because the inductor 108, in time block 310, is acting as a part of a buck converter of 102, the current through inductor 108 is positive. Illustration 300 is conceptual; inductor 108 may act as a part of boost converter 104 or a part of one of the buck converters of 102, in any time period that arbiter 204 determines power needs to flow from ambient energy source 106 to power storage device 110 or from power storage device 110 to one of the power supplies 112-116.

Figure 4:
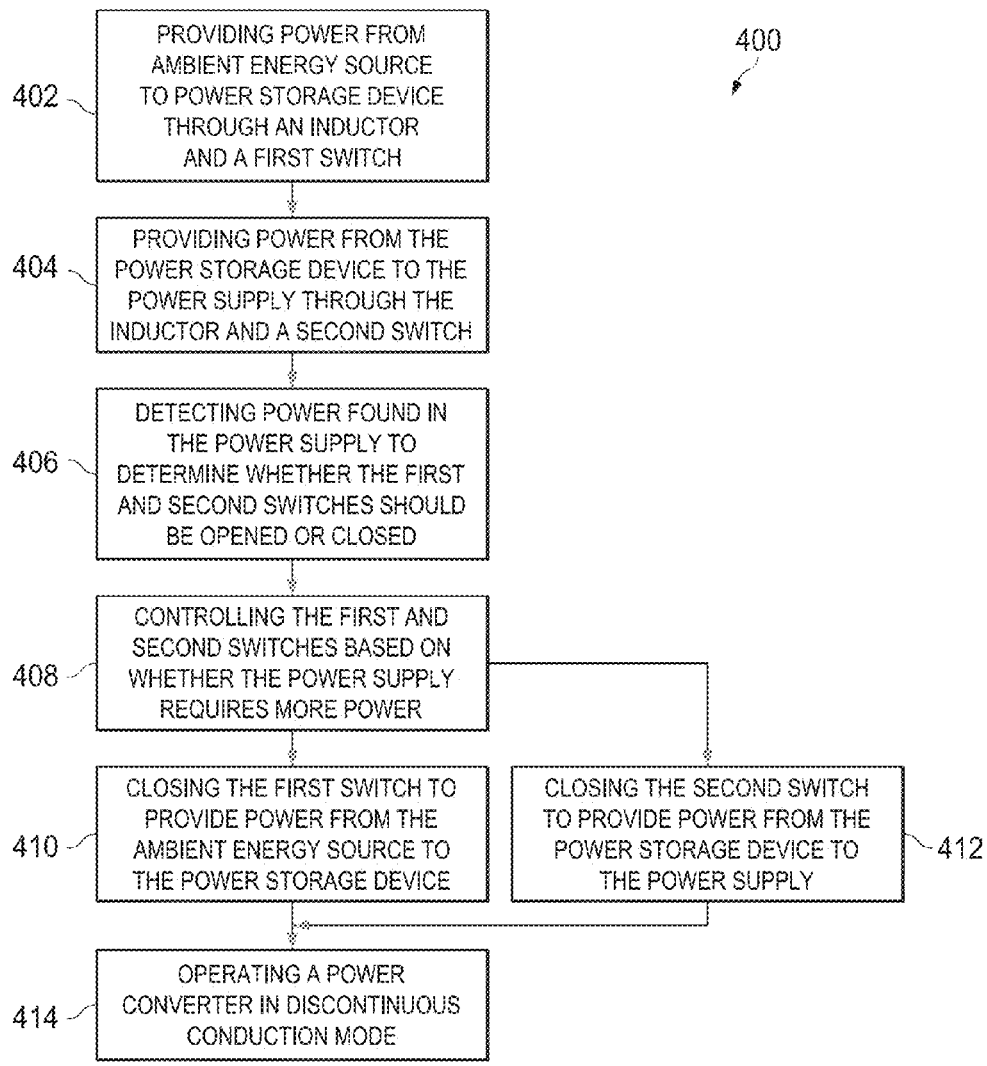
FIG. 4 shows a flow diagram of an energy management and harvesting method utilizing a single inductor, in accordance with various embodiments.

FIG. 4 shows a flow diagram of an energy management and harvesting method 400 utilizing a single inductor, in accordance with various embodiments. The method 400 begins in block 402 with providing power from an ambient energy source to a power storage device through an inductor and a first switch. As shown in FIGS. 1 and 2, the ambient energy source 106 may provide power to power storage device 110 through inductor 108 and switch 124.

In block 404, the method 400 continues with providing power, at a separate time from the providing power from the ambient energy source in block 402, from the power storage device to the power supply through the inductor and a second switch. As shown in FIGS. 1 and 2, the power storage device 110 may provide power to any of power supplies 112-116 through inductor 108 and the power supplies associated switch 118-122.

In block 406, the method 400 continues with the detecting power found in the power supply to determine whether the first and second switches should be open or closed. In block 408, the method 400 continues with the controlling the first and second switches based on whether the power supply requires more power. As shown in FIGS. 1 and 2, arbiter 204 may determine whether switch 124 or one of switches 118-122 should be open or closed based on whether one of power supplies 112-116 requires more power. Arbiter 204 may also control, through power supply controllers 206-208 and energy harvester controller 202 the opening and closing of switches 118-124.

In block 410, the method 400 continues with the closing of the first switch to provide power from the ambient energy source to the power storage device. In block 412, the method 400 continues with the closing the second switch to provide power from the power storage device to the power supply. As shown in FIGS. 1 and 2, when switch 124 is closed, power is supplied from ambient energy source 106 to the power storage device 110. When one of switches 118-122 is closed, power is supplied from power storage device 110 to one of power supplies 112-116.

In block 414, the method 400 continues with operating a power converter in discontinuous conduction mode (DCM). As shown in FIG. 1, the buck converters found in 102 and boost converter 104 may operate in discontinuous conduction mode (DCM). The buck power converter may comprise one of switches 118-122, inductor 108, and switch 126. The boost power converter may comprise switch 124, inductor 108, and switch 126.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A DC-DC converter comprising:
    (a) an inductor having a first terminal and a second, opposite terminal;
    (b) a first voltage rail for carrying a first voltage and a second voltage rail for carrying a second voltage different from the first voltage;
    (c) an ambient energy source having a first lead;
    (d) a power storage device having a first lead;
    (e) a first rail switch having a first terminal connected to the first terminal of the inductor, a second terminal connected to the first voltage rail, and a control input;
    (f) a second rail switch having a first terminal connected to the first terminal of the inductor, a second terminal connected to the second voltage rail, and a control input;
    (g) an ambient switch having a first terminal connected to the first terminal of the inductor, a second terminal connected to the first lead of the ambient energy source, and a control input; and
    (h) a storage switch having a first terminal connected to the second terminal of the inductor, a second terminal connected to the first lead of the power storage device, and a control input.

2. The DC-DC converter of claim 1 including a first energy storage device connected to the first voltage rail and a second energy storage device connected to the second voltage rail.

3. The DC-DC converter of claim 1 including a first capacitor connected to the first voltage rail and a second capacitor connected to the second voltage rail.

4. The DC-DC converter of claim 1 in which the power storage device is a battery.

5. The DC-DC converter of claim 1 in which the storage switch includes:
    (i) a high side transistor having a first terminal connected to the second terminal of the inductor, a second terminal connected to the first lead of the power storage device, and a control input;
    (ii) a low side transistor having a first terminal connected to the second terminal of the inductor, a second terminal connected to a circuit ground, and a control input;
    (iii) a first gate having control inputs and an output connected to the control input of the high side transistor; and
    (iv) a second gate having control inputs and an output connected to the control input of the low side transistor.

6. The DC-DC converter of claim 5 including:
    (i) a first controller having a first enable input, a control output connected to the control input of the first rail switch, a high side output, and a low side output;
    (ii) a second controller having a second enable input, a control output connected to the control input of the first rail switch, a high side output, and a low side output;

(iii) an energy controller having an energy enable input, a control output connected to the control input of the ambient switch, a high side output, and a low side output; and (iv) the first gate having high side inputs connected to the high side outputs of the first, second, and energy controllers; and (v) the second gate having low side inputs connected to the low side outputs of the first, second, and energy controllers.

7. The DC-DC converter of claim 5 in which the first gate is an AND gate and the second gate is an OR gate.

8. The DC-DC converter of claim 1 including:

(i) a first controller having a first enable input, a control output connected to the control input of the first rail switch, and first arbiter outputs;

(ii) a second controller having a second enable input, a control output connected to the control input of the first rail switch, and second arbiter outputs;

(iii) an energy controller having an energy enable input, a control output connected to the control input of the ambient switch, and energy arbiter outputs; and (iv) an arbiter having controller inputs connected to the first, second, and energy arbiter outputs, and having enable outputs connected to the first, second, and energy enable inputs.

9. A DC-DC converter comprising:

(a) an inductor having a first terminal and a second, opposite terminal;

(b) a first voltage rail for carrying a first voltage and a second voltage rail for carrying a second voltage different from the first voltage;

(c) an ambient energy source having a first lead;

(d) a power storage device having a first lead;

(e) first switches with separate control inputs selectively connecting the first voltage rail, the second voltage rail, and the first lead of the ambient energy source to the first terminal of the inductor;

(f) second switches having control inputs selectively connecting the second terminal of the inductor to the power storage device and circuit ground;

(g) controllers having separate enable inputs, separate control outputs connected to the first switches, separate arbiter outputs, separate high side outputs, and separate low side outputs;

(h) an arbiter having arbiter inputs connected to the separate arbiter outputs and separate enable outputs connected to the separate control inputs of the controllers; and (i) gating having inputs connected to the high side outputs and the low side outputs and having separate outputs connected to the control inputs of the second switches.

10. A process of operating a DC-DC converter having an inductor with a first terminal and a second, opposite terminal comprising:

(a) providing power at a first time from an ambient energy source to a power storage device through a first switch, the inductor and a second switch;

(b) providing power, at a second time separate from the first time, from the power storage device through the second switch, the inductor and one of plural third switches to one of plural power rails at one of plural, different voltages;

(c) providing power, at a third time separate from the first time and the second time, from the ambient energy source through the first switch and one of the plural third switches to one of plural power rails at one of plural, different voltages; and (d) detecting voltages at the voltage rails and determining whether the first, second, and third switches should be open or closed.

11. The process of claim 10 in which the detecting includes arbitrating the opening and closing of the first, second, and third switches.

12. The process of claim 10 in which the providing power at the first, second, and third times includes operating the DC-DC converter in discontinuous conduction mode.

13. The process of claim 10 in which the detecting includes operating the DC-DC converter in discontinuous conduction mode.

* * * * *